United States Patent Office 3,230,737
Patented Jan. 25, 1966

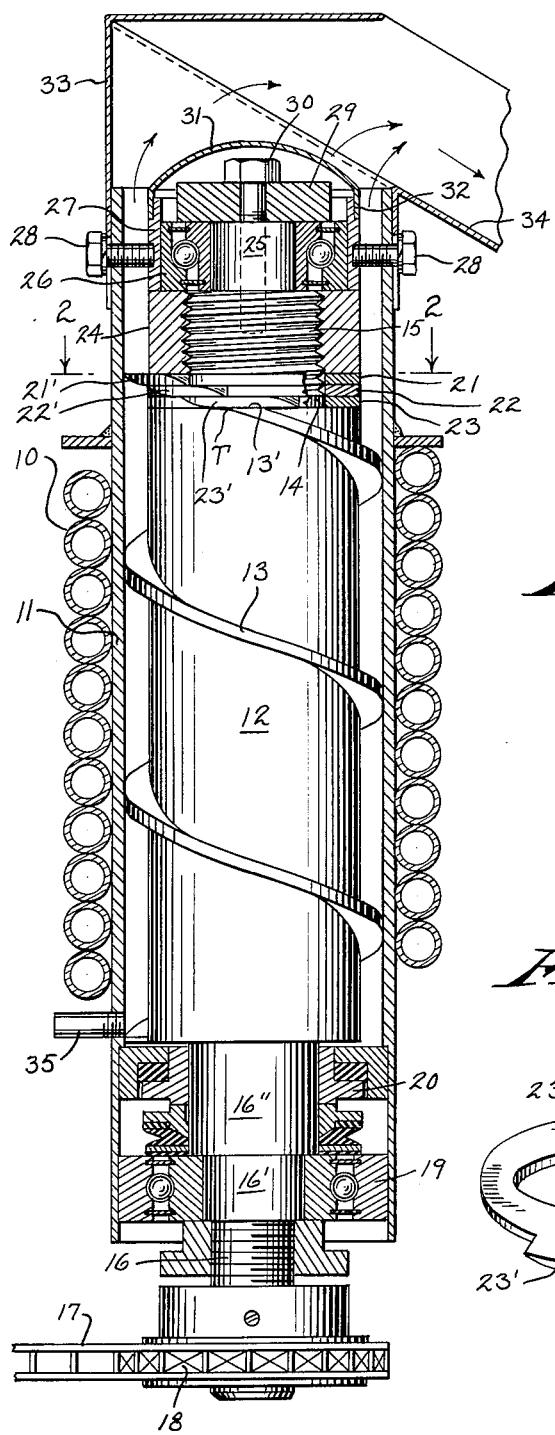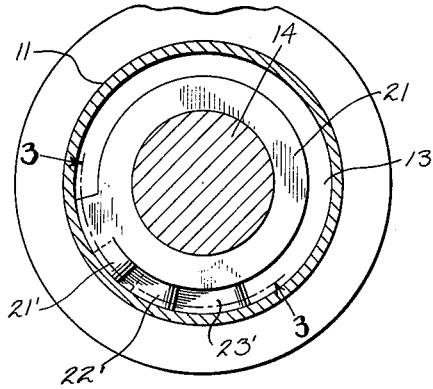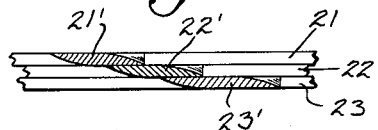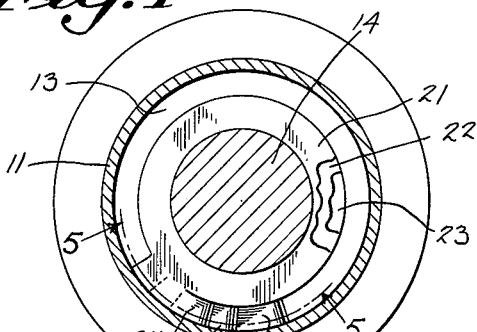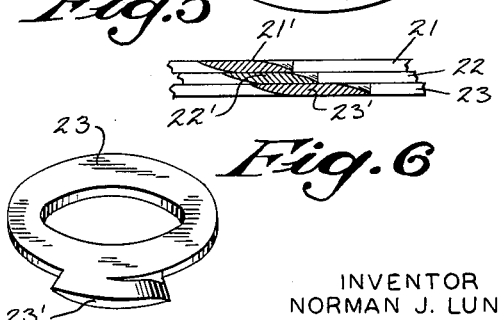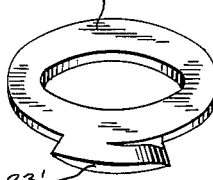
INVENTOR
NORMAN J. LUNDE
BY
Morsell & Morsell
ATTORNEYS

3,230,737
ICE NUGGET PRODUCING MACHINE
Norman J. Lunde, Harbor Road, Oconto, Wis.
Filed May 10, 1965, Ser. No. 454,475
8 Claims. (Cl. 62—354)

This invention relates to improvements in ice nugget producing machines.

There are available machines for producing ice flakes or chips, each having a vertical cylindrical ice freezing chamber wherein there is a rotatable auger working in closely spaced relation to the internal wall of the cylindrical freezing chamber to remove frozen masses from the wall and to carry the same to the upper end of the cylinder, which has associated therewith an ice compressing and crushing member so that ice chips from which excess water has been compressed are discharged through a restricted opening in the upper end of the cylindrical freezing chamber.

While the conventional ice chip producing apparatuses are satisfactory for their purposes, the slush, flake, or chip ice thus produced is not suitable for all commercial usages. In many instances, ice units in the form of hard compressed nuggets of substantial size, from which excess water has been squeezed, is preferable to slush ice or the like, and it is a general object of the present invention to provide an ice nugget producing machine in which slushy masses of ice are progressively conveyed by a bladed auger to the upper end of the freezing cylinder or chamber in which the auger operates and, by virtue of means carried by the auger, the pitch of the auger blades at its upper end is regulatable so that as the slush ice reaches the upper end of the auger it is effectively compressed to form hard nuggets of ice of a substantial predetermined size which are then discharged through the open outer end of the ice freezing cylinder or chamber.

A further object of the invention is to provide, in an ice nugget producing machine of the character described which includes a blade auger, means adjustably associated with the upper end of the auger blade to vary the pitch thereof within certain limits, whereby the density and the size of the ice nuggets produced by and delivered from the machine are regulated.

A further object of the invention is to provide, in an ice nugget producing machine having a freezing cylinder or chamber with an auger operating therein, removable means associated with the upper end of the freezing cylinder affording access to internal mechanism including the ice pellet size and density controlling means.

A further object of the invention is to provide an ice nugget producing machine which is very simple in construction, which is automatic and stable in operation, which is very compact in size, which is strong and durable, and which is well adapted for the purposes described.

With the above and other objects in view, the invention consists of the improved nugget producing machine, and its parts and combinations, as set forth in the claims, and all equivalents thereof.

In the accompanying drawings, in which the same reference characters indicate the same parts in all of the views:

FIG. 1 is a vertical sectional view through the freezing cylinder or chamber portion of an ice nugget producing machine;

FIG. 2 is a transverse sectional view taken approximately along the line 2—2 of FIG. 1 and showing certain auger blade segments in a position of relative extension;

FIG. 3 is a fragmentary detail sectional view taken approximately along the line 3—3 of FIG. 2;

FIG. 4 is a transverse sectioinal view similar to FIG. 2 only showing the auger blade segments in a collapsed position wherein they are relatively superimposed;

FIG. 5 is a fragmentary detail sectional view taken approximately along the line 5—5 of FIG. 4; and FIG. 6 is a perspective view of one of the auger blade segment washer members.

The present improvements which relate primarily to the cylindrical freezing chamber and auger construction are designed to be housed within a casing (not shown), and there is also included within the casing an ice producing apparatus (not shown), all of which is conventional in the art. The numeral 10 designates an expansion coil portion of an ice producing apparatus which may surround the major portion of an elongated hollow cylinder 11 and forms within the cylinder 11 a freezing chamber or column which is preferably disposed in an upstanding position.

An auger, generally indicated by the numeral 12, extends from one of the cylinder 11 to the other. The outer surface of the major enlarged portion of the auger is formed with a spirally-trending auger blade 13 of a desired, substantially pitch which terminates at the point T in FIG. 1, the terminal portion of the auger blade being flattened on its upper surface, as at 13′, which portion 13′ is concentric with the upper end of the major enlarged portion of the auger. The auger, beyond the upper end of its major enlarged portion, has a reduced shaft portion 14 above which, and integral therewith, there is an externally threaded stub portion 15. The auger 12, with its uniform pitch spiral blade 13, is of a diameter slightly smaller than the inside diameter of the cylinder or chamber 11 to provide a very slight space between the outer peripheral edge of the auger blade 13 and inside wall of the cylinder 11 in order to remove ice layers from the inside wall surface of said cylinder without direct contact between the edge portions of the auger blade and the cylinder wall.

The auger 12 is power driven by any suitable means such as an electric motor (not shown), which is connected to the lower shaft portion 16 of the auger by means of an endless chain 17 which drives a sprocket 18 secured onto the auger shaft portion 16. Certain reduced portions 16′ and 16″ between the major extent of the auger and the auger shaft portion 16 are mounted within a bearing 19 and a water seal 20, respectively.

As was previously noted, the auger 12, beyond the upper end of its major enlarged portion, is formed with a reduced shaft portion 14 (see FIGS. 2 and 4) whose outer surface is smooth and which portion is of a length to have mounted thereon in superimposed relation a plurality of washer-like discs 21, 22 and 23, one of which is shown in detail in FIG. 6. A marginal portion of each washer-like disc is formed with an auger blade flange or segment 21′, 22′ and 23′, respectively. By relatively rotating the washer-like discs 23 on the outer circular surface of the reduced shaft portion 14 of the auger, a retracted or extended continuation of the upper extremity of the auger blade 13 may be formed. Thus, as is shown in FIGS. 1, 2 and 3, if the auger segments 21′ and 22′ of the discs 21 and 22 are circularly advanced in a clockwise direction relative to the auger blade segment 23′ and relative to each other, the upper end portion of the auger blade will be elongated. Conversely, if the superimposed washer-like disc elements 21 and 22 are moved in a counter-clockwise direction relative to the drawing the auger blade segments can assume a more compact superimposed relationship, as is shown in FIGS. 4 and 5, and this will result in a reduction in the effective length of the auger blade 13 at its upper end portion. Of course, arcuate adjustments of the washer discs 21, 22 and 23 between the limits of furthest advancement and furthest retraction of superimposition will give a desired addition or elongation to the effective upper end portion of the auger blade. The ends of the auger blade auxiliary segments 21', 22' and 23' are beveled, as is best shown in FIGS 3, 5 and 6, and this makes for smooth joints at the superimposed extremities of the respective auger blade segments. The utility of these auger blade segments results from the fact that their slush contacting surfaces lie in planes substantially perpendicular to the axis of the auger 12 and, thus, the segments, whether compacted or extended, form a continuation of the upper end of the auger blade 13 and reduce the pitch thereof. Inasmuch as the ice scraped from the interior surface of the clyinder 11 is advanced upwardly along the auger by the spiral blade 13, when masses of the slush ice reach the upper end of the auger blade 13 and are confined between a lower convolution of the spiral blade 13 and the adjusted blade segments 21', 22' and 23', all at a reduced pitch, the ice mass prior to reaching the discharge end of the chamber or column will be substantially compressed to squeeze excess water therefrom. The degree of compression is, of course, regulated by the degree of advancement or retraction of the adjustably mounted segments 21', 22' and 23'. While it is preferable to use a plurality of washer disc elements, each with an auger blade segment, and we have shown by way of illustration three of such washer disc elements, any number of the same may be used for cooperation with the upper end portion of the auger blade, and the lengths of the blade segments may be varied.

The externally threaded stub portion 15 of the auger shaft above the portion 14 which carries the washer-like discs is adapted to have removably threaded thereon a circular nut 24 of a diameter corresponding to the external diameter of the enlarged portion of the auger 12, and the external diameters of the washer disc elements, save for their auger blade segments, correspond to the external diameter of the nut 24 and the enlarged portion of the auger. The auger shaft, above the threaded portion 15, is of reduced diameter, as at 25, and is journaled within a bearing 26 secured to a ring 27 whose outside diameter corresponds to that of the cylindrical nut 24 therebelow. A plurality of spaced-apart bolts 28 threaded through upper wall portions of the cylinder 11 extend into the bearing anchoring ring 27. On the top of the bearing 26 there is a washer 29 having a central opening therein to receive a securing bolt 30 which extends through the mid-portion of the bearing 26 and is threaded into the mid-portion of the threaded auger shaft portion 15. The washer 29 and the mounting bolt 30 are covered by a domed cap 31 whose lower marginal portions have a force fit within an annular groove 32 therefor in the upper margin of the securing ring 27. Thus, by removing the cap 31 and unthreading and removing the bolt 30, the ring or washer 29 may be removed, and by releasing the bolts 28, the bearing 26 and its ring 27 may be removed from the reduced portion 25 of the auger shaft. This then permits the cylindrical nut 24 to be unthreaded from the auger shaft portion 15, which affords direct access to the various washer discs 21, 22 and 23, whereby the same may be relatively turned in a circular direction to effect a varied pitch elongation of the upper end portion of the auger blade 13, all as was previously explained. When these parts at the upper end of the assemblage are reassembled and the circular nut 24 is turned down tightly onto the superimposed washer discs 21, 22 and 23, the same will be clamped thereby in desired positions of adjustment.

Due to the fact that the auger blade extension segments 21', 22' and 23', even in their position of furthest advancement, do not form more than a minor arc of a circle, there will be ample space between the outer wall portions of the washer discs and the inner wall portion of the cylinder 11 for the upward advancement of the formed ice elements. These compressed ice elements are relatively dense and devoid of an undue water content, and are in the form of pellets, and when the auger is turning, the formed pellets, whose size and density is controlled by the adjustment of the various auger blade extension segments, are advanced out of the upper end of the cylinder or chamber in the path indicated by the arrows in FIG. 1. The open upper end of the cylinder 11 has telescopically mounted thereon a removable housing 33 which is removably held in place by the bolts 28 and which forms an enclosed chamber over the discharge end of the cylinder 11. One side of the housing 33 has extending outwardly downwardly therefrom an inclined chute 34 whereby the discharged ice pellets are caused to slide down said chute into a reservoir or collection receptacle.

As is common in the art, suitable means are provided for maintaining a water supply within the cylinder 11 at a predetermined level, and the water is delivered into the lower portion of the freezing chamber by means of a conduit 35.

It will be apparent that, with water delivered into the cylinder 11 and with the expansion coil system 10 functioning, ice will be formed on the inner surface of the cylinder 11. When the auger is power driven at a suitable speed it will scrape ice from the interior of the cylinder 11 and the spiral blade 13 of the auger will carry the removed ice in the form of a spiral ice mass toward the top of the enlarged portion of the auger, where the ice will be effectively compressed between the adjusted reduced pitch blade segments 21', 22' and 23 and the portion of the auger blade therebelow. Hard nuggets of ice are thereby formed from which an excess of water has been eliminated. These nuggets of ice are then carried upwardly in the cylinder chamber 11 and are discharged into the housing 33 through the annular space between the inner upper wall portion of the cylinder 11 and the outer surfaces of the nut 24 and ring 27, with the ice nuggets then being discharged to a suitable collection station via the inclined chute 34. It has heretofore been pointed out that the effective extent of the superimposed auger blade segments 21', 22' and 23' may be varied to thus regulate the degree of compression and the size of the nuggets and, by removing the assemblage over the various discs 21, 22 and 23, the same may be easily adjusted.

The improved ice nugget producing machine is automatic and efficient in operation, is readily adjustable, produces ice nuggets of a superior quality, is strong and durable, and is well adapted for the purposes described.

What is claimed as the invention is:

1. In a machine for producing ice nuggets, a freezing cylinder having a first end and a second end with a discharge opening in the latter, means for supplying water to the interior of said freezing cylinder, means for cooling said freezing cylinder to freeze ice on the inside thereof, a rotatable auger member axially positioned within said freezing cylinder for advancing the ice formed therein toward said discharge opening, said auger being formed with a spiral blade of a substantial pitch between the flight portions of which the advancing ice is compressed prior to being expelled through said discharge opening, said spiral blade terminating inwardly of said cylinder discharge opening, and a pair of superimposed members carrried by a portion of the auger adjacent to and registrable with said terminal end portion of the auger blade, each of said superimposed members carrying an auger blade extension segment of a pitch substantially less than that of the auger blade and said members being circularly adjustable on the auger to extended or retracted positions to form a variable length continuation of said auger blade at a reduced pitch for the compression of the ice between said adjusted segments and a portion of the auger blade to compact the ice into dense nuggets prior to ejection of the same through said discharge opening.

2. In a machine for producing ice nuggets, a freezing container having a first end and a second end with a discharge opening in the latter, means for supplying water to the interior of said freezing container, means for cooling said freezing container to freeze ice on the inside thereof, a rotatable auger member axially positioned within said freezing container, said auger being formed with a spiral blade of a substantial pitch between the flight portions of which the ice formed on and scraped from inner wall portions of the container is advanced in compressed form toward said discharge opening prior to being expelled through the latter, said spiral blade terminating inwardly of said container discharge opening, and a plurality of superimposed members independently circularly adjustably carried by a portion of the auger adjacent to and registrable with said terminal end portion of the auger blade, each of said superimposed members carrying an auger blade extension segment of a pitch substantially less than that of the auger blade, relative extension or superimposed retraction of said members causing the segments thereof to form a continuation of said auger blade at a reduced pitch and of a predetermined length for the compression and division of the ice prior to passage of the same through said discharge opening.

3. In a machine for producing ice nuggets, a freezing container having a first end and a second end with a discharge opening in the latter, means for supplying water to the interior of said freezing container, means for cooling said freezing container to freeze ice on the inside thereof, a rotatable auger member axially positioned within said freezing container, said auger being formed with a spiral blade of a substantial pitch between the flight portions of which the ice formed on and scraped from inner wall portions of the container is advanced in compressed form toward said discharge opening prior to being expelled through the latter, said spiral blade terminating inwardly of said container discharge opening, and a plurality of superimposed discs independently circularly adjustably carried by a portion of the auger adjacent to and registrable with said terminal end portion of the auger blade, each of said superimposed discs having on its outer margin an auger blade extension segment of a pitch substantially less than that of the auger blade, relative extension or superimposed retraction of said discs causing the segments thereof to advance relative to one another to form an elongated continuation of said auger blade at a reduced pitch or to form a compact stack to result in a shortened continuation of the auger blade at a reduced pitch.

4. In a machine for producing ice nuggets, an upright freezing container having a lower end and an upper end with a discharge opening in the latter, means for supplying water to the interior of said freezing container, means for cooling said freezing container to freeze ice on the inside thereof, a rotatable auger member axially positioned within said freezing container, the outer surface of said auger being formed with a spiral blade of a substantial pitch between the flight portions of which the ice formed on and scraped from inner wall portions of the container is advanced in compressed form toward said discharge opening prior to being expelled through the latter, said spiral blade terminating inwardly of said container discharge opening, the upper end portion of said auger above the terminal end of the auger blade being formed as a reduced shaft portion, and a plurality of apertured discs independently circularly adjustably mounted on the reduced shaft portion of the auger adjacent to said terminal end portion of the auger blade, each of said superimposed discs having on its periphery an auger blade extension segment of a pitch substantially less than that of the auger blade, circular movements of said discs causing relative extension or superimposed retraction of said extension segments and to form a reduced pitch continuation of said auger blade.

5. In a machine for producing ice nuggets, an upright freezing cylinder having a lower end and an upper end with a discharge opening in the latter, means for supplying water to the interior of said freezing cylinder, means for cooling said freezing cylinder to freeze ice on the inside thereof, a rotatable auger member axially positioned within said freezing cylinder, the outer surface of said auger being formed with a spiral blade of a substantial pitch between the flight portions of which the ice formed on and scraped from inner wall portions of the cylinder is advanced in compressed form toward said discharge opening prior to being expelled through the latter, said spiral blade terminating below said cylinder discharge opening, the upper end portion of said auger above the terminal end of the auger blade being formed as a reduced shaft portion, a plurality of apertured discs independently circularly adjustably mounted on the reduced shaft portion of the auger adjacent to said terminal end portion of the auger blade, each of said superimposed discs having on its periphery an auger blade extension segment of a pitch substantially less than that of the auger blade, circular movements of said discs causing extension or superimposed retraction of said extension segments relative to one another and relative to the terminal end portion of the auger blade, and releasable means carried by the reduced shaft portion of the auger to clamp the superimposed discs in a desired position of adjustment.

6. In a machine for producing ice nuggets, an upright freezing cylinder having a lower end and an upper end with a discharge opening in the latter, means for supplying water to the interior of said freezing cylinder, means for cooling said freezing cylinder to freeze ice on the inside thereof, a rotatable auger member axially positioned within said freezing cylinder, the outer surface of said auger being formed with a spiral blade of a substantial pitch between the flight portions of which the ice formed on and scraped from inner wall portions of the cylinder is advanced in compressed form toward said discharge opening prior to being expelled through the latter, said spiral blade terminating below said cylinder discharge opening, the upper end portion of said auger above the terminal end of the auger blade being formed as a reduced shaft portion, a plurality of apertured discs independently circularly adjustably mounted on the reduced shaft portion of the auger adjacent to said terminal end portion of the auger blade, each of said superimposed discs having on its periphery an auger blade extension segment of a pitch substantially less than that of the auger blade, circular movements of said discs causing extension or superimposed retraction of said extension segments relative to one another and relative to the terminal end portion of the auger blade, a clamping nut operatively mounted on said reduced shaft portion of the auger over said discs to releasably impinge on the latter, and a removable cap on the upper end of the auger shaft covering said discs but providing an annular space between it and the inner wall of the cylinder.

7. In combination, an elongated freezing chamber having an open end, means for supplying water to the inside of said freezing chamber, means for cooling said freezing chamber to freeze ice on the inside thereof, an ice conveying auger rotatably mounted in the freezing chamber and having a spiral blade which terminates below the open end of the freezing chamber, the edge of said spiral blade being disposed in closely spaced relation to the inside wall of said chamber, means for rotating the auger to cause the blade edge to scrape ice frozen on the inside wall of the chamber for advancement toward the open end of the freezing chamber, a pair of independent auger blade extension segment members circularly adjustably carried by the auger adjacent the terminal end portion of the auger blade and registrable with the latter to form a reduced pitch continuation thereof of a predetermined length, and common means carried by the auger to releasably clamp both of said reduced pitch auger blade extension segment members in a desired position of adjustment.

8. In combination, an elongated freezing chamber having an open end, means for supplying water to the inside of said freezing chamber, means for cooling at least a portion of said freezing chamber to freeze ice on the inside surface thereof, an ice conveying auger rotatably mounted in the freezing chamber and having a spiral blade which terminates inwardly of the open end of the freezing chamber, the edge of said spiral blade being disposed in closely spaced relation to the inside wall of said chamber, an end portion of the auger having a reduced shaft portion, means for rotating the auger to cause the blade edge to scrape ice frozen on the inside wall of the chamber for advancement toward the open end of the freezing chamber, a pair of superimposed independent members each adjustably carried by the reduced shaft portion of the auger adjacent the terminal end portion of the auger blade and registrable with the latter to form a variable length, reduced pitch continuation thereof, common means associated with the reduced shaft portion of the auger to releasably clamp said reduced pitch auger blade extension members in a desired position of adjustment, and a cap removably applied to the upper end portion of the auger.

References Cited by the Examiner
UNITED STATES PATENTS

| | | | |
|---|---|---|---|
| 3,126,719 | 3/1964 | Swatsick | 62—320 |
| 3,139,740 | 7/1964 | Swatsick | 62—320 |
| 3,165,904 | 1/1965 | Jones | 62—188 |
| 3,183,682 | 5/1965 | Conto | 62—298 |

MEYER PERLIN, *Primary Examiner.*

ROBERT A. O'LEARY, *Examiner.*

W. E. WAYNER, *Assistant Examiner.*